(12) United States Patent
Ruiz Gomis et al.

(10) Patent No.: US 9,567,974 B2
(45) Date of Patent: Feb. 14, 2017

(54) CONTROL DEVICE FOR HYDRAULIC TURBINES

(75) Inventors: Vicente Ruiz Gomis, Rojales (ES);
Joaquin Orts Paredes, Benejuzar (ES);
Jaime Lledo Lara, Barcelona (ES);
Jose Carlos Orts Paredes, Formentera Del Segura (ES)

(73) Assignee: TECNOTURBINES, S.L., Formentera Del Segura (Alicante) (ES)

( * ) Notice: Subject to any disclaimer, the term of this patent is extended or adjusted under 35 U.S.C. 154(b) by 459 days.

(21) Appl. No.: 14/129,196

(22) PCT Filed: Jun. 25, 2012

(86) PCT No.: PCT/ES2012/000178
§ 371 (c)(1),
(2), (4) Date: Mar. 26, 2014

(87) PCT Pub. No.: WO2013/001112
PCT Pub. Date: Jan. 3, 2013

(65) Prior Publication Data
US 2014/0236367 A1 Aug. 21, 2014

(30) Foreign Application Priority Data
Jun. 27, 2011 (ES) .................................. 201100746

(51) Int. Cl.
*G05D 3/12* (2006.01)
*F03D 7/02* (2006.01)
(Continued)

(52) U.S. Cl.
CPC ............ *F03D 7/0272* (2013.01); *F03B 15/16* (2013.01); *F03D 7/043* (2013.01); *E03B 7/072* (2013.01);
(Continued)

(58) Field of Classification Search
CPC ...................................................... F03D 7/0272
(Continued)

(56) References Cited

U.S. PATENT DOCUMENTS 3,724,214 A * 4/1973 Bryant .................... F01K 17/04
60/648
3,982,389 A * 9/1976 Maker ...................... F02C 9/32
60/39.281
(Continued)

FOREIGN PATENT DOCUMENTS

ES 8705577 A1 7/1987
JP H09137771 A 5/1997
(Continued)

OTHER PUBLICATIONS

Antonio, F. de O. "Modelling and control of oscillating-body wave energy converters with hydraulic power take-off and gas accumulator." Ocean engineering 34.14 (2007): pp. 2021-2032.*
(Continued)

*Primary Examiner* — Satish Rampuria
(74) *Attorney, Agent, or Firm* — Peter B. Scull; Hamilton, DeSanctis & Cha LLP

(57) ABSTRACT

Control device for hydraulic turbines configured to adjust the resistant torque provided by the generator to the movement of the impeller of an hydraulic turbine so that a stable pressure is set at the inlet (Pi) and at the outlet (Po) regardless of the circulating flow rate (Q), and to adjust the electrical energy produced by the turbine to achieve the desired hydraulic behavior, the device comprising a controller and a power device; wherein said controller is connected to a pressure detector at the inlet (Pi) and at the outlet (Po) and to a flow-meter for obtaining the circulating flow rate (Q), as well as to a power sensor for measuring the power of the turbine; all this, in such a way that the controller acts on the power device for causing the application of the
(Continued)

braking torque necessary to maintain a stable set-point value on the turbine.

13 Claims, 1 Drawing Sheet

(51) Int. Cl.
*F03B 15/16* (2006.01)
*F03D 7/04* (2006.01)
*E03B 7/07* (2006.01)

(52) U.S. Cl.
CPC ..... *F05B 2270/3011* (2013.01); *F05B 2270/3013* (2013.01); *F05B 2270/335* (2013.01); *Y02E 10/226* (2013.01)

(58) Field of Classification Search
USPC .................................................. 700/286–306
See application file for complete search history.

(56) References Cited

U.S. PATENT DOCUMENTS

| | | | | |
|---|---|---|---|---|
| 4,475,865 A | * | 10/1984 | Sugishita | F03B 15/04 415/36 |
| 5,800,309 A | * | 9/1998 | Takiguchi | F16H 61/061 477/144 |
| 2014/0244051 A1 | * | 8/2014 | Rollins | G05D 27/02 700/282 |

FOREIGN PATENT DOCUMENTS

| | | |
|---|---|---|
| JP | 2002155846 A | 5/2002 |
| JP | 2009007995 A | 1/2009 |

OTHER PUBLICATIONS

Drew, Benjamin, A. R. Plummer, and M. Necip Sahinkaya. "A review of wave energy converter technology." Proceedings of the Institution of Mechanical Engineers, Part A: Journal of Power and Energy 223.8 (2009): pp. 887-902.*

Nehrir, M. Hashem, et al. "A review of hybrid renewable/alternative energy systems for electric power generation: Configurations, control, and applications." Sustainable Energy, IEEE Transactions on 2.4 (2011): pp. 392-403.*

International Search Report and Written Opinion, International Application No. PCT/ES2012/000178, mailed Oct. 10, 2012, pp. 1-11, Spanish Patent and Trademark Office, Madrid Spain (English and Spanish with translation of Spanish part into English).

* cited by examiner

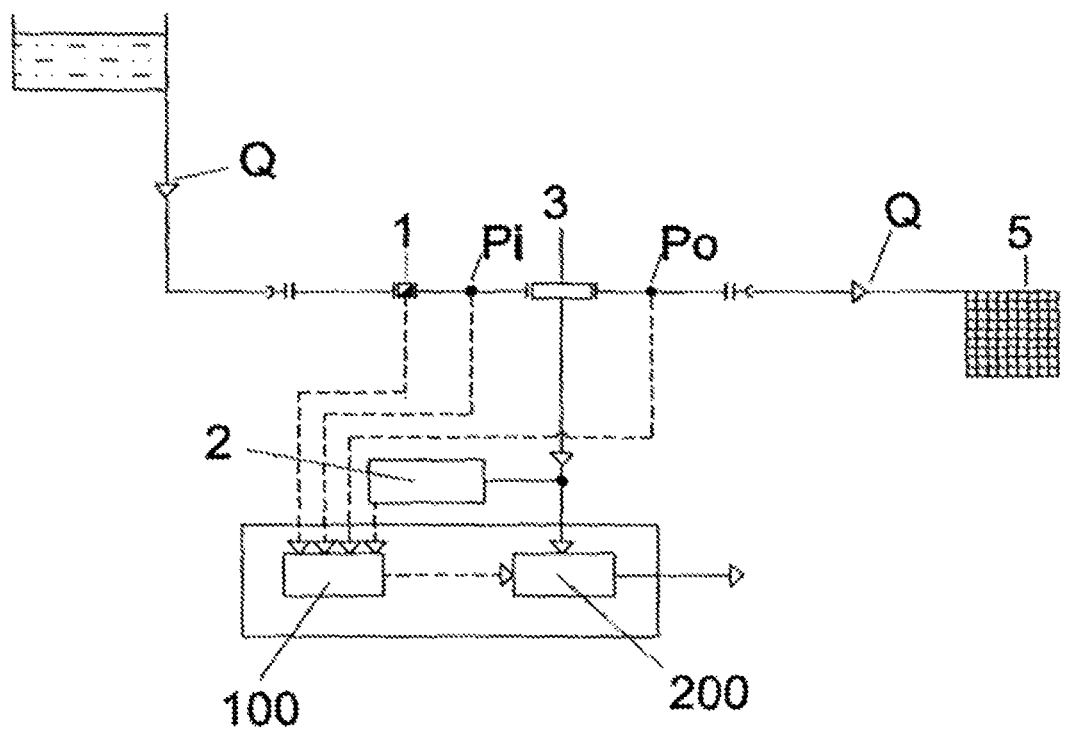

CONTROL DEVICE FOR HYDRAULIC TURBINES

The present subject matter refers to a control device conceived for use in hydraulic turbines in order to provide them with a high capacity of energy recovery for their facility, especially in supply networks.

BACKGROUND

Nowadays, in water supply networks, a wide range of regulating elements are available which allow adjusting the values of water flow rate and pressure, at different points in the network, with the aim of meeting the needs of users.

An example of this is the case of the regulating valves which are capable of causing a frictional loss pressure to maintain a constant pressure at the outlet regardless of the flow rate. These valves are generally used to reduce the pressure in certain parts of the network, which prevents breakages or decreases the level of leakages.

On numerous occasions it has been tried to use hydraulic turbines to replace said regulating valves and to achieve an electrical exploitation, the major drawback being the adjustment of the turbine to the flow rate values changing over time (since they depend on the users demand), further having to maintain a constant pressure at the outlet (pressure regulating valves) or at the inlet (pressure sustaining valves).

A typical case of this flow rate variability is constituted by urban potable water supply networks, in which the flow rate at nighttime is very low compared to the water demand at daytime consumption peaks.

The applicant knows the existence of numerous devices or means for adjusting the operation of a turbine depending on the circulating flow rate or pressure differential to be exploited. Such systems are usually mechanical and are present in high power turbines for hydroelectric exploitation. As an example of this, devices can be mentioned that are based on the orientation of the blades of the turbine, as it is the case with Kaplan turbines. These systems seek to maintain a high performance and a given rotation rate regardless of the flow rate to be processed by the turbine and pressure differential to be exploited, since they are usually equipped with synchronous generators that must rotate at a given speed to inject the energy into the grid.

These systems have the disadvantage of their high mechanical complexity, especially when they are to be installed in a micro-turbine for energy recovery in urban supply networks.

Similarly, the applicant knows the existence of hydraulic micro-turbines installable in supply networks which, however, do not have a suitable control system that allow them to adjust its operation to the required conditions of flow rate and pressure. Therefore, these turbines are not able to ensure a constant pressure at the outlet, but it depends on the circulating flow rate.

In an attempt to improve the hydraulic operation of these micro-turbines, assemblies have been carried out by placing a reducing valve at the outlet or a stopper at the inlet in order to thus achieve a level of constant pressure at the outlet regardless of the flow rate.

In this regard, it is noteworthy that although they achieve their objective hydraulically, they result very energy inefficient because they do not allow exploiting all the available pressure differential, part of which is lost by friction in the regulating valve, the stopper or any other mechanical element.

In turn, and for a completely opposed aspect of such systems, the applicant knows the so-called "regenerative braking systems" used in various fields of industry, which allow regulating the braking torque of a generator and therefore the generated electrical power.

Typically, such regenerative braking systems are connected to generators or servomotors of the brushless type.

Practical examples of this can be found in hybrid vehicles (which recover energy from braking to recharge batteries), in new generation elevators, in servomotors for braking of shafts, etc.

SUMMARY

The technical problem solved herein is to increase the overall energy performance in supply networks such as networks of potable water, filtered irrigation water, etc.

To solve this technical problem it is described a control device for hydraulic turbines that, connected with a micro-turbine, allows an electronic control and a regenerative braking of the micro-turbine.

In fact, the device is provided to regulate the braking torque exerted by the generator on the turbine shaft, to which it is integrally attached, so as to maintain a constant pressure at the inlet or outlet of the turbine regardless of the water flow rate circulating through it. Thus, it is achieved that the turbine behaves like a pressure regulating valve, maintaining a constant level of pressure at the inlet, with the further advantage of being able to generate electrical energy by replacing the existing pressure regulating or sustaining valves.

More specifically, the control device for hydraulic turbines is configured to adjust the resistant torque provided by the generator to the movement of the impeller of a hydraulic turbine so that a stable pressure is set at the inlet or outlet regardless of the circulating flow rate, and to adjust the electrical energy produced by the turbine to achieve the desired hydraulic behavior, which is characterized by comprising a first controller and a second power device; wherein said controller is connected to a pressure detector at the inlet and at the outlet, and a flow-meter for obtaining the circulating flow rate, and to a power sensor for measuring the power of the turbine; all this, in such a way that said the controller acts on the second power device for causing the application of the braking torque necessary to maintain a stable set-point value in the turbine.

BRIEF DESCRIPTION OF THE FIGURES

In the following, a series of drawings is described very briefly which help to better understand the invention and which are expressly related to an embodiment of said invention which is presented as a non-limiting example thereof.

FIG. 1 shows a schematic view of a typical example of assembly of the control device for hydraulic turbines.

DETAILED EXAMPLE

As previously explained, the device hereof allows a new control strategy based on which the turbine exploits at any time the maximum hydraulic energy available in the network, further ensuring a stable hydraulic behavior despite the flow rate variations that occur in supply networks, since it depends on the needs of users.

The use of a regenerative braking system in hydraulic turbines permits adjusting the resistant torque provided by the generator to the movement of the impeller, so that a stable pressure level can be ensured at the inlet or outlet of the turbine regardless of the flow rate circulating through it and, therefore, adjusting the generated electrical energy to the available hydraulic energy.

As shown in the attached FIGURE, the device hereof comprises a first controller (100) and a second power device (200).

The first controller (100), in a first embodiment, comprises a PLC that receives signals of pressure at the inlet (Pi), pressure at the outlet (Po), circulating flow rate (Q) obtained through a flow-meter (1) and generated electric power, which is obtained via a network analyzer (2) connected directly to the power signal of the turbine (3).

The first controller (100) presents a PID structure.

Appropriate orders can be sent through the controller (100) to the second power device (200) to apply the braking torque necessary to maintain a stable set-point value. Therefore, it is configured to adjust the electrical energy produced by the turbine (3) to achieve the desired hydraulic behavior.

Based on the received signals, the first controller (100) is configured to operate in one of the following operation modes:

a) a first mode, wherein the turbine (3) regulates the pressure; wherein the first controller (100) is configured to calculate the braking torque necessary to maintain the pressure set-point at the outlet or at the inlet of the turbine (3) regardless of the demanded flow rate, having a hydraulic behavior equal than a pressure regulating valve.

b) a second mode with the turbine (3) at maximum power, wherein the first controller (100) is configured to calculate the braking torque with the maximum generated power without ensuring a constant pressure, since it will depend on the demanded flow rate (Q).

c) a third mode with the turbine (3) at maximum performance, wherein the first controller (100) is configured to determine the braking torque necessary for the yield to be maximum, without ensuring a constant pressure value, maximizing the ratio between the generated electric power and the available hydraulic power; and, d) a fourth mode with the turbine (3) regulating the flow rate (Q), wherein the controller (100) is configured to set the braking torque necessary to maintain a constant flow rate set-point regardless of the pressure upstream (Pi) or downstream (Po) of the turbine (3).

The second power device (200), which is directly connected to the generator of the turbine (3), is responsible for adjusting the generated electrical energy to charge a battery or for injection into the grid. Likewise, is are responsible for exciting the windings of the stator of the generator according to the order of the first controller (100), so that the resistant torque therein is adequate to maintain the set-point.

On a practical level, the second power device (200) can be implemented by a driver (201) based on a bridge of thyristors or IGBT antiparallel configured and synchronized by the signals received by the first controller (100), allowing a controlled passage of current generated by the generator itself, which could be of the "brushless" type, and so regulate the braking torque exerted by it on the impeller of the turbine.

In the attached FIGURE, it can be seen how the generating turbine (3) is installed in the duct (4), and is placed in an underground chamber or a valves room along with the measuring equipment [pressure sensors (Po, Pi) and flow-meter (1)]. Thus, a pressure sensor is placed at the inlet (Pi) and another at the outlet (Po) of the turbine (3), while the flow-meter (1) can be placed at the inlet or outlet thereof.

The wiring of signals from the measuring equipment [the network analyzer (2)], as well as the wiring of power from the generator of the turbine (3), conduct it to the control device (100, 200), which may be located in the same enclosure or in a separate enclosure.

The power output of the control device (100, 200), which can be monitored with a network analyzer (2), is connected to the energy receiving system (5), which may be an inverter for injection of electricity into the network, an equipment of battery charging, a particular facility for self-consumption, or any other system which can exploit electrical energy.

By controlling the regenerative braking, the turbine (3) can operate at different rotation rates depending on the conditions of flow rate (Q) and available hydraulic jump.

The invention claimed is:

1. A control device for hydraulic turbines configured to adjust the resistant torque provided by the generator to the movement of the impeller of a hydraulic turbine so that a stable pressure is set at the inlet or at the outlet regardless of the circulating flow rate, and to adjust the electrical energy produced by the turbine to achieve the desired hydraulic behavior, the control device comprising a controller and a power device, wherein said controller is connected to a pressure detector that detects the pressure at the inlet and at the outlet and to a flow-meter for obtaining the circulating flow rate, as well as to a power sensor that measures the power of the turbine, so that the controller acts on the power device for causing the application of the braking torque necessary to maintain a stable set-point value on the turbine; and, wherein, based on the received signals, the controller is configured to operate in one of the following modes:

a) a first mode, wherein the turbine regulates the pressure; wherein the controller is configured to calculate the braking torque necessary to maintain the pressure set-point at the outlet or at the inlet of the turbine regardless of the demanded flow rate, having a hydraulic behavior equal to a pressure regulating valve;

b) a second mode with the turbine at maximum power, wherein the controller is configured to calculate the braking torque with the maximum generated power without ensuring a constant pressure, since it will depend on the demanded flow rate;

c) a third mode with the turbine at maximum performance, wherein the controller is configured to determine the braking torque necessary for the yield to be maximum, without ensuring a constant pressure value, maximizing the ratio between the generated electric power and the available hydraulic power; and, d) a fourth mode with the turbine regulating the flow rate, wherein the controller is configured to set the braking torque necessary to maintain a constant flow rate set-point regardless of the pressure upstream or downstream of the turbine.

2. The device of claim 1, wherein the power device is configured to excite the windings of the stator of the generator according to the order of the controller, so that the resistant torque therein is adequate to maintain the set-point.

3. The device of claim 2, wherein the power device comprises a driver based on a bridge of thyristors or anti-parallel IGBT configured and synchronized as a result of the signals received by the controller, allowing a controlled passage of current generated by the generator, and so regulating the braking torque exerted by it on the impeller of the turbine.

4. The device of claim 1, wherein the power device comprises a driver based on a bridge of thyristors or antiparallel IGBT configured and synchronized as a result of the signals received by the controller, allowing a controlled passage of current generated by the generator itself, and so regulating the braking torque exerted by it on the impeller of the turbine.

5. The device of any of claim 1, wherein the power device is connected to an energy receiving system, which is selected from an inverter for injection of electricity into the network, an equipment of battery charging, a particular facility for self-consumption, or any other system which is able to exploit electrical energy.

6. A control device for a hydraulic turbine coupled to an electric generator, comprising a driver for the generator and a controller for the driver, so that the generator is able to apply to the turbine the braking torque necessary to maintain a stable set-point value, the controller being connected to pressure sensors at the inlet and outlet of the turbine, to a flow-meter for measuring the flow rate in the turbine and to a network analyzer for determining the power generated by the generator, the controller being configured to calculate the braking torque necessary for the generated electric power to be maximum; and, wherein, based on the received signals, the controller is configured to operate in one of the following modes:
a) a first mode, wherein the turbine regulates the pressure; wherein the controller is configured to calculate the braking torque necessary to maintain the pressure set-point at the outlet or at the inlet of the turbine regardless of the demanded flow rate, having a hydraulic behavior equal to a pressure regulating valve;
b) a second mode with the turbine at maximum power, wherein the controller is configured to calculate the braking torque with the maximum generated power without ensuring a constant pressure, since it will depend on the demanded flow rate;
c) a third mode with the turbine at maximum performance, wherein the controller is configured to determine the braking torque necessary for the yield to be maximum, without ensuring a constant pressure value, maximizing the ratio between the generated electric power and the available hydraulic power; and,
d) a fourth mode with the turbine regulating the flow rate, wherein the controller is configured to set the braking torque necessary to maintain a constant flow rate set-point regardless of the pressure upstream or downstream of the turbine.

7. The device of claim 6, wherein the driver is configured to excite the windings of the stator of the generator according to the order of the controller, so that the resistant torque therein is adequate to maintain the set-point.

8. The device of claim 6, wherein the driver comprises a bridge of thyristors or antiparallel IGBT configured and synchronized as a result of the signals received by the controller, allowing a controlled passage of current generated by the generator, and so regulating the braking torque exerted by it on the impeller of the turbine.

9. The device of claim 6, wherein the driver is connected to an energy receiving system, which is selected from an inverter for injection of electricity into the network, an equipment of battery charging, a particular facility for self-consumption, or any other system which is able to exploit electrical energy.

10. A control device for a hydraulic turbine coupled to an electric generator, comprising a driver for the generator and a controller for the driver, so that the generator is able to apply to the turbine the braking torque necessary to maintain a stable set-point value, the controller being connected to pressure sensors at the inlet and outlet of the turbine, to a flow-meter for measuring the flow rate in the turbine and to a network analyzer for determining the power generated by the generator, the controller being configured to calculate the braking torque necessary for the electric yield to be maximum; and, wherein, based on the received signals, the controller is configured to operate in one of the following modes:
a) a first mode, wherein the turbine regulates the pressure; wherein the controller is configured to calculate the braking torque necessary to maintain the pressure set-point at the outlet or at the inlet of the turbine regardless of the demanded flow rate, having a hydraulic behavior equal to a pressure regulating valve;
b) a second mode with the turbine at maximum power, wherein the controller is configured to calculate the braking torque with the maximum generated power without ensuring a constant pressure, since it will depend on the demanded flow rate;
c) a third mode with the turbine at maximum performance, wherein the controller is configured to determine the braking torque necessary for the yield to be maximum, without ensuring a constant pressure value, maximizing the ratio between the generated electric power and the available hydraulic power; and,
d) a fourth mode with the turbine regulating the flow rate, wherein the controller is configured to set the braking torque necessary to maintain a constant flow rate set-point regardless of the pressure upstream or downstream of the turbine.

11. The device of claim 10, wherein the driver is configured to excite the windings of the stator of the generator according to the order of the controller, so that the resistant torque therein is adequate to maintain the set-point.

12. The device of claim 10, wherein the driver comprises a bridge of thyristors or antiparallel IGBT configured and synchronized as a result of the signals received by the controller, allowing a controlled passage of current generated by the generator, and so regulating the braking torque exerted by it on the impeller of the turbine.

13. The device of claim 10, wherein the driver is connected to an energy receiving system, which is selected from an inverter for injection of electricity into the network, an equipment of battery charging, a particular facility for self-consumption, or any other system which is able to exploit electrical energy.

* * * * *